US008599188B2

(12) United States Patent
Zhan et al.

(10) Patent No.: US 8,599,188 B2
(45) Date of Patent: Dec. 3, 2013

(54) DATA DRIVER AND DISPLAY APPARATUS HAVING THE SAME

(75) Inventors: Zhifeng Zhan, Yongin-si (KR); Won-Chang Chung, Seoul (KR)

(73) Assignee: Samsung Display Co., Ltd. (KR)

( * ) Notice: Subject to any disclaimer, the term of this patent is extended or adjusted under 35 U.S.C. 154(b) by 1002 days.

(21) Appl. No.: 12/269,792

(22) Filed: Nov. 12, 2008

(65) Prior Publication Data

US 2009/0309862 A1 Dec. 17, 2009

(30) Foreign Application Priority Data

Jun. 17, 2008 (KR) ........................ 10-2008-0056901

(51) Int. Cl.
*G06F 3/038* (2013.01)

(52) U.S. Cl.
USPC .............................. 345/212; 345/211; 345/98

(58) Field of Classification Search
USPC ........... 345/212, 98, 211; 341/144; 365/185.2
See application file for complete search history.

(56) References Cited

U.S. PATENT DOCUMENTS

| | | | | |
|---|---|---|---|---|
| 6,304,241 | B1 | 10/2001 | Udo et al. | |
| 7,215,271 | B2 | 5/2007 | Ido et al. | |
| 8,179,389 | B2 * | 5/2012 | Fan | 345/211 |
| 2004/0104873 | A1 | 6/2004 | Kang et al. | |
| 2005/0052906 | A1 * | 3/2005 | Kim et al. | 365/185.2 |
| 2006/0017596 | A1 * | 1/2006 | Ido et al. | 341/144 |
| 2007/0030236 | A1 * | 2/2007 | Kim et al. | 345/98 |

FOREIGN PATENT DOCUMENTS

| | | | | |
|---|---|---|---|---|
| CN | 1438621 | A | | 8/2003 |
| CN | 1855703 | A | | 11/2006 |
| CN | 101075398 | A | | 11/2007 |
| JP | 07-230264 | | | 8/1995 |
| JP | 2000-29438 | | | 1/2000 |
| JP | 2000029438 | A | * | 1/2000 |
| JP | 2000-156639 | | | 6/2000 |
| JP | 2005-077992 | | | 3/2005 |
| JP | 2006-173779 | | | 6/2006 |
| JP | 2007-11398 | | | 1/2007 |
| JP | 2007011398 | A | * | 1/2007 |
| KR | 2000-0004893 | | | 1/2000 |
| KR | 2004-0048522 | | | 6/2004 |
| KR | 20040048522 | A | * | 6/2004 |
| KR | 20040048522 | A | * | 10/2004 |
| WO | 97/49080 | A1 | | 12/1997 |

* cited by examiner

*Primary Examiner* — Quan-Zhen Wang
*Assistant Examiner* — Troy Dalrymple
(74) *Attorney, Agent, or Firm* — Innovation Counsel LLP

(57) ABSTRACT

In a data driver, an inverter inverts a first data signal from a first group of data signals. A converter includes first and second converting circuits. The first converting circuit converts a second data signal included from second group of data signals into a first gamma voltage. The second converting circuit has a circuit configuration inverted with respect to the first converting circuit. The second converting circuit converts the inverted first data signal into a second gamma voltage. An output buffer stores the first and second gamma voltage outputs from the converter and then outputs them. Thus, although gamma voltage is interfered from the coupling between a signal line and a gamma voltage line, a user can have normal images regardless of s the gamma voltage variation. The present invention relates to charge-trapping memories in the application of display panels.

20 Claims, 4 Drawing Sheets

DATA DRIVER AND DISPLAY APPARATUS HAVING THE SAME

REFERENCE TO RELATED APPLICATION

This application claims priority to and benefit from Korean Patent Application No. 2008-56901 filed on Jun. 17, 2008, under 35 U.S.C. §119, the contents of which are herein incorporated by reference in its entirety.

BACKGROUND OF THE INVENTION

1. Field of the Invention

The present invention relates to a data driver and a display apparatus, In particular, the present invention relates to a data driver capable of providing a desired image on a display panel and a display apparatus having the data driver.

2. Description of the Related Art

Typically, a liquid crystal display (LCD) includes a liquid crystal display panel that displays an image. LCDs are classified into polysilicon type LCDs and amorphous silicon type LCDs.

In a polysilicon type LCD, a gate driver, which applies a gate signal to the liquid crystal display panel, and a data driver, which applies a gamma voltage to the liquid crystal display panel, are integrated on the liquid crystal display panel through a thin film process. In addition, various parts, such as a timing controller, a gamma voltage generator, etc., are further integrated on the liquid crystal display panel.

The data driver includes a shift register, a latch, a converter, and an output buffer. The converter receives a plurality of gamma voltages from the gamma voltage generator. The converter selects a gamma voltage among the plurality of gamma voltages at the trigger of a data signal from the timing controller, and outputs the selected gamma voltage.

In the converter, gamma voltage lines cross data signal lines. Consequently, unwanted coupling between them changes the gamma voltage along with the change of the logic state of the data signal. As a result, the converter can not output the correct gamma voltage, and the liquid crystal display panel can not display the images faithful to the desired gray scales.

SUMMARY

The present invention provides a data driver capable of preventing image deterioration due to electrical interference on a gray scale display, and a display apparatus employing the data driver A data driver includes an inverter, a converter, and an output buffer. The inverter inverts a first data signal from a first group of data signals to generate inverted first data signals. The inverter is positioned between the converter and a latch. The converter includes a first converting circuit and a second converting circuit. The first converting circuit converts a second data signal from a second group of data signals to a first gamma voltage. The second converting circuit re-inverts the inverted first data signal and converts the inverted first data signals to a second gamma voltage. The output buffer stores and outputs the first and second gamma voltages that are output from the converter.

One of the advantages of the invention is that a user will see normal images regardless of the gamma voltage variation caused by unwanted coupling from data signals.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, the present invention will be explained in detail with reference to the accompanying drawings.

Figure 1:
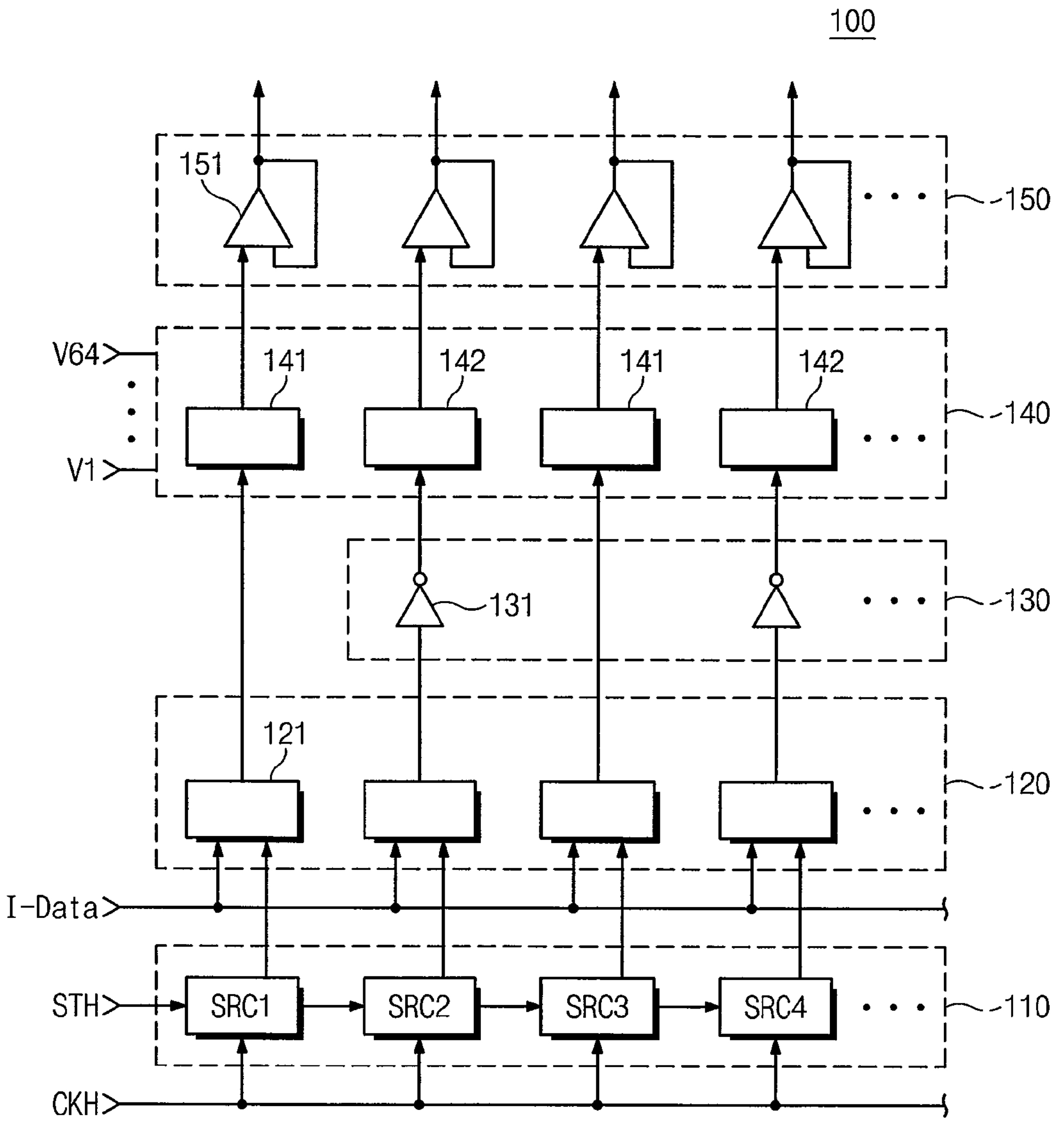
FIG. 1 is a block diagram showing an exemplary embodiment of a data driver according to the present invention.

FIG. 1 is a block diagram showing an exemplary embodiment of a data driver according to one embodiment of the present invention.

Referring to FIG. 1, a data driver 100 includes a shift register 110, a latch part 120, an inverter part 130, a converter part 140, and an output buffer part 150.

The shift register 110 includes k (k is a natural number equal to or larger than 2) stages. In the present exemplary embodiment, four stages SRC1, SRC2, SRC3 and SRC4 will be described as an example. A clock signal CKH is applied to each stage of the shift register 110, and a horizontal start signal STH is applied to a first stage SRC1. When the first stage SRC1 starts its operation in response to the horizontal start signal STH, the four stages SRC1, SRC2, SRC3 and SRC4 sequentially output four control signals in response to the clock signal CKH.

The latch part 120 includes k latches which connect to the k SRC stages in one-to-one correspondence, such that the first latch 121 connects to stage SRC1 and so on. The k latches store k data signals from I-data, in response to the sequential control signal from the k stages. In the present exemplary embodiment, each data signal has 6 bit data.

The latch part 120 provides the first data signal from the first group of the k data signals in I-data to the inverter part 130, and provides the second data signal from the second group of the k data signals in I-data. For instance, the first group may include even-numbered data signals, and the second group may include odd-numbered data signals among I-data.

The inverter part 130 includes half of k inverters, for example, 131 is one inverter. The inverter part 130 inverts half of k data signals from the latch part 120 and applies them to the converter part 140.

The converter part 140 includes a plurality of first converting circuits 141 and a plurality of second converting circuits 142. The first converting circuits 141 convert the second data signal into a first gamma voltage, and the second converting circuits 142 re-inverts the inverted data signal and convert it into a second gamma voltage. In the present exemplary embodiment, the second converting circuits 142 are inverted with respect to the first converting circuits 141.

The converter part 140 receives $2^j$ gamma voltages that are successively increased by a constant voltage level. In the present exemplary embodiment, j indicates the number of bits of each data signal. For instance, when each data signal has six bits, the converter part 140 receives 64 gamma voltages V1~V64. The detailed circuit configuration of the converter part 140 will be described with reference to FIG. 2.

The output buffer part 150 includes k operational amplifiers 151. The output buffer part 150 temporarily stores k gamma voltages from the converter part 140 and outputs them at the same time.

Figure 2:
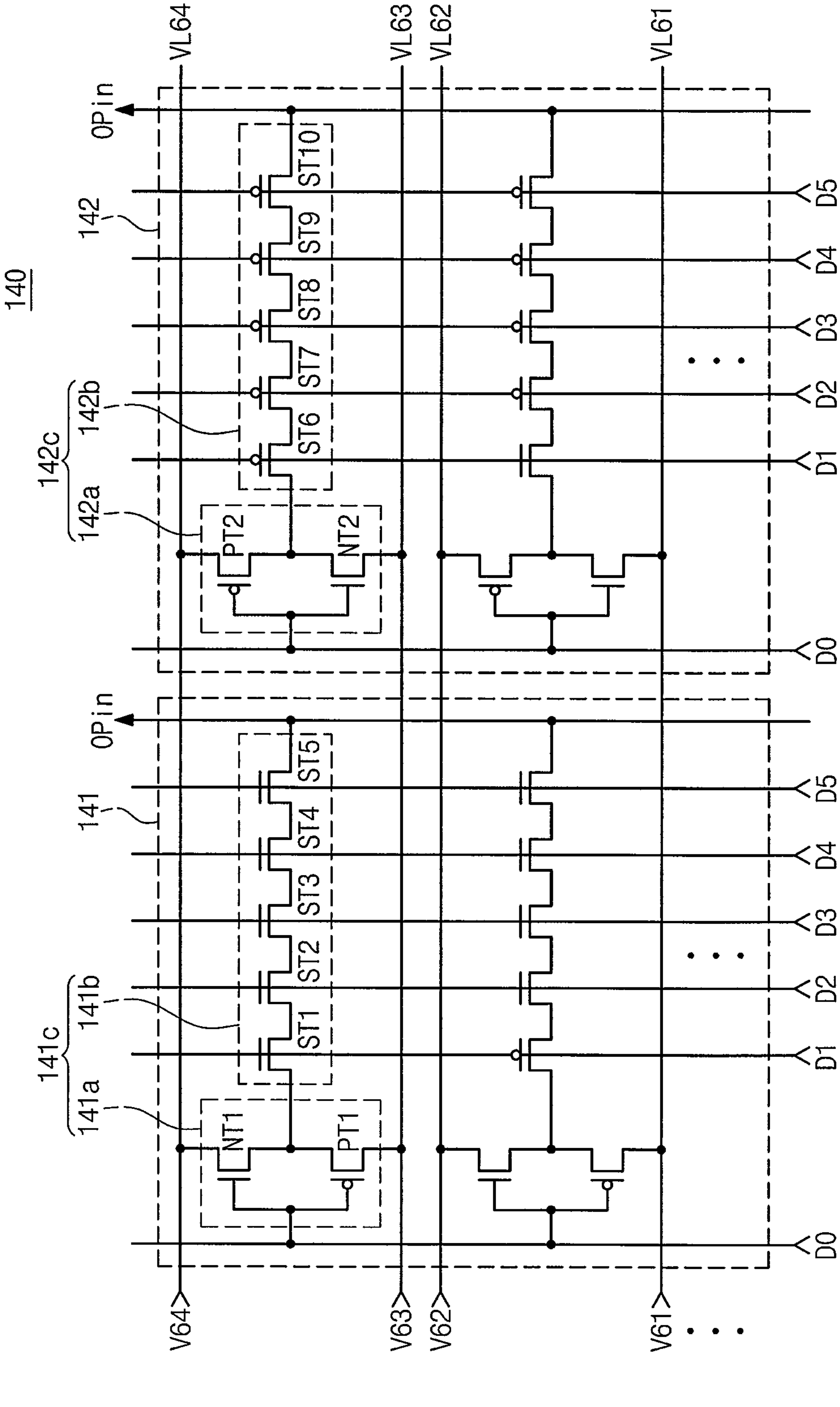
FIG. 2 is a circuit diagram showing a circuit configuration of a converter shown in FIG. 1.

FIG. 2 is a circuit diagram showing a circuit configuration of a converter shown in FIG. 1. In FIG. 2, only one first converting circuit of the first converting circuits and only one second converting circuit of the second converting circuits have been shown.

Referring to FIG. 2, the converter part 140 includes $2^j$ gamma voltage lines ( . . . , VL61, VL62, VL63, VL64) receiving $2^j$ gamma voltages ( . . . , V61, V62, V63, V64) that are successively increased. In the present exemplary embodiment, four gamma voltage lines VL61, VL62, VL63 and VL64 and four gamma voltages V61, V62, V63 and V64 will be described as an example. The $2^j$ gamma voltage lines VL61, VL62, VL63 and VL64 are commonly connected to the first and second converting circuits 141 and 142.

The first converting circuit 141 includes a plurality of first gamma voltage selection circuits 141*c* and outputs a first gamma voltage. The second converting circuit 142 includes a plurality of second gamma voltage selection circuits 142*c* and outputs a second gamma voltage.

Each first gamma voltage selection circuit 141*c* is positioned between a (2i-th gamma voltage line to which a (2i)-th gamma voltage is applied and a (2i-1)-th gamma voltage line to which a (2i-1)-th gamma voltage is applied. Thus, each first gamma voltage selection circuit 141*c* may output either the (2i)-th gamma voltage or the (2i-1)-th gamma voltage in response to the second data signal. In the present exemplary embodiment, i is a natural number between 1 and j, inclusive.

Each first gamma voltage selection circuit 141*c* includes a first voltage selecting part 141*a* and a first switching part 141*b*. The first voltage selecting part 141*a* outputs either the (2i)-th gamma voltage or the (2i-1)-th gamma voltage in response to an LSB (Least Significant Bit) D0 of the received second signal.

As shown in FIG. 2, the first voltage selecting part 141*a* includes a first N-type transistor NT1 and a first P-type transistor PT1. The first N-type transistor NT1 includes a control terminal connected to a first signal line receiving the LSB D0 of the second data signal, an input terminal receiving the (2i)-th gamma voltage from the (2i)-th gamma voltage line, and an output terminal connected to an output terminal of the first voltage selecting part 141*a*. The first P-type transistor PT1 includes a control terminal connected to the first signal line receiving the LSB D0 of the second data signal, an input terminal receiving the (2i-1)-th gamma voltage from the (2i-1)-th gamma voltage line, and an output terminal connected to the output terminal of the first voltage selecting part 141*a*.

When assuming that the second data signal has six bits, the first switching part 141*b* transmits the gamma voltage from the first voltage selecting part 141*a* to the output buffer part 150 or blocks the gamma voltage from the first voltage selecting part 141*a* in response to remaining five bits D1, D2, D3, D4 and D5 of the received second data signal. To this end, the first switching part 141*b* includes first, second, third, fourth and fifth transistors ST1, ST2, ST3, ST4 and ST5, which are connected between the output terminal of the first voltage selecting part 141*a* and an input terminal OPin of the output buffer part 150 (see, FIG. 1) in series.

Control terminals of the first to fifth transistors ST1~ST5 are electrically connected to first to fifth signal lines receiving the remaining five bits D1~D5 of the second data signal, respectively. Thus, the first to fifth transistors ST1~ST5 are turned on or off according to the logic state of the remaining five bits, thereby transmitting or blocking the gamma voltage output from the first voltage selecting part 141*a*.

Each second gamma voltage selection circuit 142*c* is positioned between the (2i)-th gamma voltage line and the (2i-1)-th gamma voltage line among the $2^j$ gamma voltage lines. Thus, each second gamma voltage selection circuit 142*c* may output either the (2i)-th or the (2i-1)-th gamma voltage in response to the first data signal.

Each second gamma voltage selection circuit 142*c* includes a second voltage selecting part 142*a* being inverted with respect to the first voltage selecting part 141*a* and a second switching part 142*b* being inverted with respect to the first switching part 141*b*. The second voltage selecting part 142*a* outputs either the (2i)-th or the (2i-1)-th gamma voltage in response to the LSB D0 of the inverted first data signal. Responsive to remaining five bits D1~D5 of the inverted first data signal, the switching part 142*b* transmits the gamma voltage output from the second voltage selecting part 142*a* to the output buffer 150 or blocks the gamma voltage output from the second voltage selecting part 142*a*.

As shown in FIG. 2, the second voltage selecting part 142*a* includes a second P-type transistor PT2 and a second N-type transistor NT2. The second P-type transistor PT2 includes a control terminal connected to a sixth signal line receiving the LSB D0 of the inverted first data signal, an input terminal receiving the (2i)-th gamma voltage from the (2i)-th gamma voltage line, and an output terminal connected to an output terminal of the second voltage selecting part 142*a*. The second N-type transistor NT2 includes a control terminal connected to the sixth signal line receiving the LSB D0 of the inverted first data signal, an input terminal receiving the (2i-1)-th gamma voltage from the (2i-1)-th gamma voltage line, and an output terminal connected to the output terminal of the second voltage selecting part 142*a*.

When assuming that the first data signal has six bits, the second switching part 142*b* transmits the gamma voltage from the second voltage selecting part 142*a* to the output buffer part 150 or blocks the gamma voltage from the second voltage selecting part 142*a* in response to remaining five bits D1, D2, D3, D4 and D5 of the inverted first data signal. To this end, the second switching part 142*b* includes sixth, seventh, eighth, ninth and tenth transistors ST6, ST7, ST8, ST9 and ST10, which are connected between the output terminal of the second voltage selecting part 142*a* and the input terminal OPin of the output buffer part 150 in series.

Control terminals of the sixth to tenth transistors ST6~ST10 are electrically connected to sixth to tenth signal lines receiving the remaining five bits D1~D5 of the first data signal, respectively. Thus, the sixth to tenth transistors ST6~ST10 are turned on or off according to the logic state of the remaining five bits, thereby transmitting or blocking the gamma voltage output from the second voltage selecting part 142*a*.

When the second data signal of "111111" is applied to the first converting circuit 141, the first voltage selecting parts 141*a* included in the first gamma voltage selection circuits 141*c* outputs a relatively large voltage of two gamma voltages in response to logic high "1" of the LSB D0. Also, since the first to fifth transistors ST1, ST2, ST3, ST4 and ST5 of final first switching part 141*b* are turned on in response to logic state "11111" of the remaining five bits D1~D5 of the second data signal, only sixty-fourth gamma voltage V64 output from final first voltage selecting part 141*a* may be applied to the output buffer 150. Accordingly, the first converting circuit 141 may select the sixty-fourth gamma voltage V64 corresponding to the second data signal of the logic state "111111".

Meanwhile, as an example of the present invention, the first data signal of logic state "111111" is inverted by the inverter part 130, so that the inverted first data signal of logic state "000000" is applied to the second converting circuit 142. The second voltage selecting parts 142*a* in the second gamma voltage selection circuits 142*c* outputs a relatively large voltage of two gamma voltages in response to logic low "0" of the LSB D0. However, since the sixth to tenth transistors ST6, ST7, ST8, ST9 and ST10 of final second switching part 142*b* are turned on in response to logic state "00000" of the remaining five bits D1~D5 of the inverted first data signal, only sixty-fourth gamma voltage V64 output from final second voltage selecting part 142*a* may be applied to the output buffer 150. Thus, the second converting circuit 142 may select the sixty-fourth gamma voltage V64 corresponding to the first data signal of the logic state "111111" after receiving the inverted first data signal of logic state "000000".

As described above, when the first and second data signals are generated at a logic state "111111" in order to display 64 gray scales with six bits, the first converting circuit 141 receives the second data signal of the logic state "111111", and the second converting circuit 142 receives the inverted first data signal of the logic state "000000". Thus, the gamma voltages applied to the gamma voltage lines are coupled to a rising direction in the first converting circuit 141 by the second data signal of the logic state "111111". Particularly, since a circuit connected to the LSB has a more complex configuration than others, variation of the gamma voltage increases more when the LSB has the logic state of "1" than when the LSB has the logic state of "0" from the coupling effect. The gamma voltages are coupled to a falling direction in the second converting circuit 142 by the inverted first data signal of the logic state "000000". Accordingly, when displaying the 64 gray scales, the first gamma voltage, which is higher than a normal sixty-fourth gamma voltage applied to the sixty-fourth gamma voltage line VL64, is the output from the first converting circuit 141, and the second gamma voltage, which is lower than the normal sixty-fourth gamma voltage, is the output from the second converting circuit 142.

However, the first and second gamma voltage outputs from the first and second converting circuits 141 and 142 offset each other due to the coupling effect after they are applied to the display panel. As a result, a user will see the sixty-four gray scales corresponding to the sixty-fourth gamma voltage V64 normally displayed on the display panel.

In summary, when the first and second converting circuits 141 and 142 have circuit configurations inverted to each other, the user will see normal images regardless of gamma voltage variations caused by coupling between signal lines and gamma voltage lines.

Figure 3:
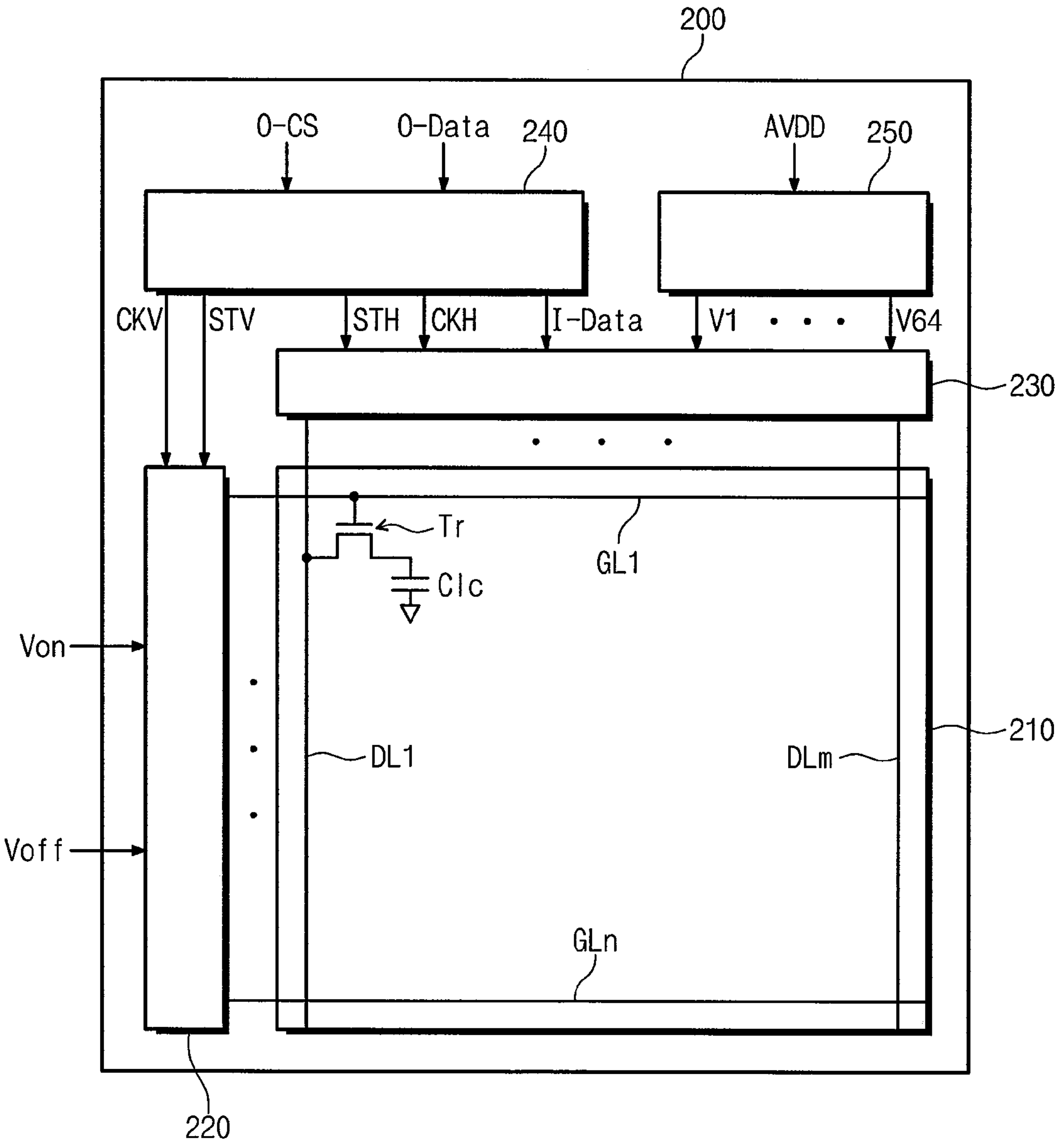
FIG. 3 is a block diagram showing another exemplary embodiment of a display apparatus according to one embodiment of the present invention.
Figure 4:
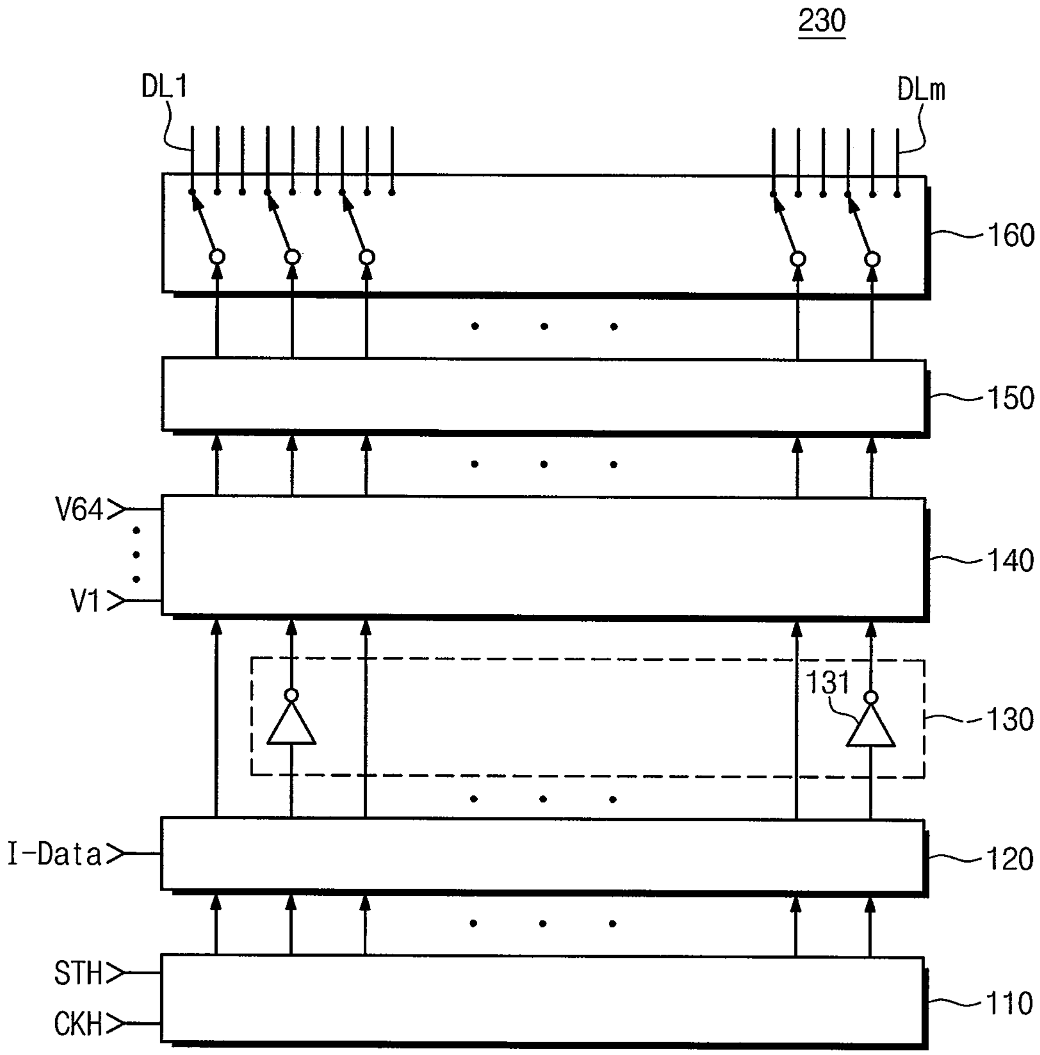
FIG. 4 is a block diagram showing a data driver shown in FIG. 3.

FIG. 3 is a block diagram showing another exemplary embodiment of a display apparatus according to the present invention, and FIG. 4 is a block diagram showing a data driver used in FIG. 3.

Referring to FIG. 3, a display apparatus includes a liquid crystal display panel 200 which includes a substrate, on which a display part 210 is placed, a gate driver 220 and a data driver 230 are arranged on the substrate and positioned adjacent to the display part 210.

The display part 210 includes a plurality of gate lines GL1~GLn, a plurality of data lines DL1~DLm, and a plurality of pixels. The gate lines GL1~GLn are insulated from the data lines DL1~DLm while crossing them to the pixel areas. The pixels are arranged in the pixel areas.

Each pixel includes a thin film transistor Tr, which is connected to a corresponding gate line and a corresponding data line, and a liquid crystal capacitor Clc which is connected to an output terminal of the thin film transistor Tr. Although not shown in FIG. 3, each pixel may further include a storage capacitor.

The gate driver 220 and the data driver 230 are directly integrated on the substrate through a thin film process applied to form the pixels in the display part 210. The gate driver 220 is electrically connected to the gate lines GL1~GLn and the data driver 230 is electrically connected to the data lines DL1~DLm.

The display apparatus further includes a timing controller 240 that outputs control signals to drive the gate and data drivers 220 and 230 and a gamma voltage generator 250 that applies a plurality of gamma voltages V1~V64 to the data driver 230. In the present exemplary embodiment, the timing controller 240 and the gamma voltage generator 250 are directly integrated on the substrate by a thin film process.

The timing controller 240 receives a control signal O-CS and an image signal O-Data, then applies a vertical start signal STV and a clock signal CKV to the gate driver 220, and a horizontal start signal STH and a clock signal STH to the data driver 230.

The gate driver 220 includes a shift register in which plural stages are connected to each other. The shift register receives a gate-on voltage Von and a gate-off voltage Voff., starts its operation in response to the vertical start signal STV, and sequentially outputs the gate-on voltage Von in response to the clock signal CKV.

The data driver 230 has a circuit configuration as shown in FIG. 4. The data driver 230 includes the shift register 110, a latch part 120, an inverter part 130, a converter part 140, an output buffer part 150, and a transmission gate circuit 160. In FIG. 4, the same reference numbers denote the same elements as in FIG. 1, and thus detailed description of the same elements is omitted here.

The transmission gate circuit 160 is positioned between the output buffer part 150 and the data lines DL1~DLm arranged on the display part 210. The transmission gate circuit 160 receives k gamma voltages from the output buffer part 150 and multiplexes the k gamma voltages.

As an example of the present invention, the data lines DL1~DLm are divided into first, second and third groups. That is, the first group includes (3k-2)-th data lines, the second group includes (3k-1)-th data lines, and the third group includes (3k)-th data lines. In the present exemplary embodiment, k is a natural number equal to or larger than 1, and k is equal to m/3.

Accordingly, the transmission gate circuit 160 selects the data lines of the first group to transmit the k gamma voltages, then selects the data lines of the second group to transmit the k gamma voltages, and finally selects the data lines of the third group to transmit the k gamma voltages.

The converter part 140 included in the data driver 230 has the same circuit configuration as shown in FIG. 2. In other words, the converter part 140 includes the first and second converting circuits 141 and 142 that have circuit configurations inverted to each other. Thus, although the gamma voltage varies by the coupling between the signal line and the gamma voltage line, the user will see normal images regardless of the gamma voltage variations.

Although the exemplary embodiments of the present invention have been described, it is understood that the present invention should not be limited to these exemplary embodiments, but various changes and modifications can be made by one ordinary skilled in the art within the spirit and scope of the present invention as hereinafter claimed.

What is claimed is:

1. A data driver comprising:

an inverter that inverts each bit of a multiple bit first data signal included in a first group of data signals to generate an inverted multiple bit first data signal;

a converter that includes a first converting circuit and a second converting circuit, the first converting circuit converting a multiple bit second data signal included in a second group of the data signals to a first gamma voltage and the second converting circuit being connected to the inverter and re-inverting the inverted multiple bit first data signal to convert the re-inverted multiple bit first data signal to a second gamma voltage; and an output buffer being connected to the first and second converting circuits to store and output the first and second gamma voltage that are output from the converter, wherein the first converting circuit includes a plurality of first gamma voltage selection circuits to select the first gamma voltage in response to the second data signal, and the second converting circuit comprises a plurality of second gamma voltage selection circuits to select the second gamma voltage in response to the first data signal, wherein each of the first gamma voltage selection circuits includes a first voltage selecting part that outputs either a (2i)-th gamma voltage or a (2i-1)-th gamma voltage in response to an LSB (Least Significant Bit) of the second data signal (i is a natural number equal to or greater than 1), wherein the first voltage selecting part includes:

a first N-type transistor configured to have a control terminal receiving the LSB bit of the second data signal, an input terminal receiving the (2i)-th gamma voltage from the (2i)-th gamma voltage line, and an output terminal connected to an output terminal of the first voltage selecting part; and a first P-type transistor configured to have a control terminal receiving the LSB bit of the second data signal, an input terminal receiving the (2i-1)-th gamma voltage from the (2i-1)-th gamma voltage line, and an output terminal connected to the output terminal of the first voltage selecting part, and wherein each of the second gamma voltage selection circuits includes a second voltage selecting part that outputs either a (2i)-th gamma voltage or a (2i-1)-th gamma voltage in response to an LSB (Least Significant Bit) of the inverted first data signal, the second voltage selecting part being inverted with respect to the first voltage selecting part, wherein the second voltage selecting part comprises:

a first P-type transistor configured to have a control terminal receiving the LSB bit of the inverted first data signal, an input terminal receiving the (2i)-th gamma voltage from the (2i)-th gamma voltage line, and an output terminal connected to an output terminal of the second voltage selecting part; and a first N-type transistor configured to have a control terminal receiving the LSB bit of the inverted first data signal, an input terminal receiving the (2i-1)-th gamma voltage from the (2i-1)-th gamma voltage line, and an output terminal connected to the output terminal of the second voltage selecting part.

2. The data driver of claim 1, wherein each of the data signals has j bit data (j is a natural number equal to or lager than 1), and the converter further comprises $2^j$ gamma voltage lines to which $2^j$ gamma voltages are applied, respectively.

3. The data driver of claim 2, wherein the $2^j$ gamma voltage lines are commonly connected to the first converting circuit and the second converting circuit.

4. The data driver of claim 3, wherein each of the first gamma voltage selection circuits are positioned between a (2i)-th gamma voltage line (i is a natural number equal to or larger than 1) to which a (2i)-th gamma voltage is applied and a (2i-1)-th gamma voltage line to which a (2i-1)-th gamma voltage is applied among the $2^j$ gamma voltage lines, and each of the second gamma voltage selection circuits are positioned between the (2i)-th gamma voltage line and the (2i-1)-th gamma voltage line among the $2^j$ gamma voltage lines.

5. The data driver of claim 4, wherein each of the first gamma voltage selection circuits comprises:

a first switching part positioned between the first voltage selecting part and the output buffer outputs the gamma voltage from the first voltage selecting part to the output buffer or blocks the gamma voltage from the first voltage selecting part in response to the remaining bits of the second data signal, and wherein each of the second gamma voltage selection circuits comprises:

a second switching part positioned between the second voltage selecting part and the output buffer outputs the gamma voltage from the second voltage selecting part to the output buffer or blocks the gamma voltage from the second voltage selecting part in response to the remaining bits of the inverted first data signal, the second switching part being inverted with respect to the first switching part.

6. The data driver of claim 5, wherein the first switching part comprises j-1 transistors (j is a natural number equal to or larger than 2) that are connected between the output terminal of the first voltage selecting part and an input terminal of the output buffer in series, and the second switching part comprises j-1 transistors that are connected between the output terminal of the second voltage selecting part and the input terminal of the output buffer.

7. The data driver of claim 4, wherein each of the first gamma voltage selection circuits comprises:

a first switching part positioned between the first voltage selecting part and the output buffer outputs the gamma voltage from the first voltage selecting part to the output buffer or blocks the gamma voltage from the first voltage selecting part in response to the remaining bits of the second data signal, and wherein each of the second gamma voltage selection circuits comprises:

a second switching part positioned between the second voltage selecting part and the output buffer outputs the gamma voltage from the second voltage selecting part to the output buffer or blocks the gamma voltage from the second voltage selecting part in response to the remaining bits of the inverted first data signal, the second switching part being inverted with respect to the first switching part.

8. The data driver of claim 1, wherein the first group of data signals comprises even-numbered data signals, and the second group of data signals comprises odd-numbered data signals.

9. The data driver of claim 1, further comprising:

a shift register including plural stages that are connected to each other to sequentially output control signals; and a latch storing the data signals in response to the control signal output from the shift register, wherein the latch applies the first data signal included in the first group to the inverter and applies the second data signal included in the second group to the converter.

10. The data driver of claim 1, wherein the converter is configured to receive multiple different gamma voltages, the first converting circuit is configured to select a first gamma voltage from among the multiple different gamma voltages based on the multiple bit second data signal, and the second converting circuit is configured to select a second gamma voltage from among the multiple different gamma voltages based on the inverted multiple bit first data signal.

11. A display apparatus comprising:

a gate driver that sequentially outputs a plurality of gate voltages;

a data driver that outputs a plurality of gamma voltages; and a display part that displays an image corresponding to the gamma voltages in response to the gate voltages, wherein the data driver comprises:

an inverter that inverts each bit of a multiple bit first data signal from a first group of data signals to generate an inverted multiple bit first data signal;

a converter that includes a first converting circuit and a second converting circuit, the first converting circuit converting a multiple bit second data signal included in a second group of the data signals to a first gamma voltage and the second converting circuit being connected to the inverter and re-inverting the inverted multiple bit first data signal to convert the re-inverted multiple bit first data signal to a second gamma voltage; and an output buffer being connected to the first and second converting circuits to store and output the first and second gamma voltages output from the converter, wherein the first converting circuit includes a plurality of first gamma voltage selection circuits to select the first gamma voltage in response to the second data signal, and the second converting circuit comprises a plurality of second gamma voltage selection circuits to select the second gamma voltage in response to the first data signal, wherein each of the first gamma voltage selection circuits includes a first voltage selecting part that outputs either a (2i)-th gamma voltage or a (2i-1)-th gamma voltage in response to an LSB (Least Significant Bit) of the second data signal (i is a natural number equal to or greater than 1), wherein the first voltage selecting part includes:

a first N-type transistor configured to have a control terminal receiving the LSB bit of the second data signal, an input terminal receiving the (2i)-th gamma voltage from the (2i)-th gamma voltage line, and an output terminal connected to an output terminal of the first voltage selecting part; and a first P-type transistor configured to have a control terminal receiving the LSB bit of the second data signal, an input terminal receiving the (2i-1)-th gamma voltage from the (2i-1)-th gamma voltage line, and an output terminal connected to the output terminal of the first voltage selecting part, and wherein each of the second gamma voltage selection circuits includes a second voltage selecting part that outputs either a (2i)-th gamma voltage or a (2i-1)-th gamma voltage in response to an LSB (Least Significant Bit) of the inverted first data signal, the second voltage selecting part being inverted with respect to the first voltage selecting part, wherein the second voltage selecting part comprises:

a first P-type transistor configured to have a control terminal receiving the LSB bit of the inverted first data signal, an input terminal receiving the (2i)-th gamma voltage from the (2i)-th gamma voltage line, and an output terminal connected to an output terminal of the second voltage selecting part; and a first N-type transistor configured to have a control terminal receiving the LSB bit of the inverted first data signal, an input terminal receiving the (2i-1)-th gamma voltage from the (2i-1)-th gamma voltage line, and an output terminal connected to the output terminal of the second voltage selecting part.

12. The display apparatus of claim 11, wherein each of the data signal has j bit data (j is a natural number equal to or lager than 1), and the converter further comprises $2^j$ gamma voltage lines to which $2^j$ gamma voltages are applied, respectively.

13. The display apparatus of claim 12, further comprising a gamma voltage generator which applies the $2^j$ gamma voltages to the $2^j$ gamma voltage lines.

14. The display apparatus of claim 13, wherein each of the first gamma voltage selection circuits are positioned between a (2i)-th gamma voltage line (i is a natural number equal to or larger than 1) to which a (2i)-th gamma voltage is applied and a (2i-1)-th gamma voltage line to which a (2i-1)-th gamma voltage is applied among the 2? gamma voltage lines, and each of the second gamma voltage selection circuits are positioned between the (2i)-th gamma voltage line and the (2i-1)-th gamma voltage line among the $2^j$ gamma voltage lines.

15. The display apparatus of claim 14, wherein each of the first gamma voltage selection circuits comprises:

a first switching part positioned between the first voltage selecting part and the output buffer outputs the gamma voltage from the first voltage selecting part to the output buffer or blocks the gamma voltage from the first voltage selecting part in response to the remaining bits of the second data signal, and wherein each of the second gamma voltage selection circuits comprises:

a second switching part positioned between the second voltage selecting part and the output buffer outputs the gamma voltage from the second voltage selecting part to the output buffer or blocks the gamma voltage from the second voltage selecting part in response to the remaining bits of the inverted first data signal, the second switching part being inverted with respect to the first switching part.

16. The display apparatus of claim 11, wherein the data driver further comprises:

a shift register including plural stages that are connected to each other to sequentially output control signals; and a latch storing the data signals in response to the control signal output from the shift register, wherein the latch applies the first data signal from the first group to the inverter and applies the second data signal from the second group to the converter.

17. The display apparatus of claim 16, wherein the display part comprises k×n data lines, and the data driver further includes a transmission gate circuit positioned between the output buffer and the display part in order to sequentially apply the gamma voltages to k groups having n data lines in response to k transmission gate signals.

18. The display apparatus of claim 11, wherein the gate driver and the data driver are directly integrated on a substrate in which the display part is arranged.

19. The display apparatus of claim 11, wherein the first group of data signals comprises even-numbered data signals, and the second group of data signals comprises odd-numbered data signals.

20. The display apparatus of claim 11, wherein the converter is configured to receive multiple different gamma voltages, the first converting circuit is configured to select a first gamma voltage from among the multiple different gamma voltages based on the multiple bit second data signal, and the second converting circuit is configured to select a second gamma voltage from among the multiple different gamma voltages based on the inverted multiple bit first data signal.

* * * * *